United States Patent
Tsai et al.

[11] Patent Number: 6,075,242
[45] Date of Patent: Jun. 13, 2000

[54] OPTICAL SCANNING MODULE WITH ADJUSTABLE OPTICAL PATH

[75] Inventors: Jern-Tsair Tsai, Taipei Hsien; Bill Chen, Ping-Tung, both of Taiwan

[73] Assignee: Mustek Systems Inc., Hsin-Chu, Taiwan

[21] Appl. No.: 09/187,198

[22] Filed: Nov. 3, 1998

[51] Int. Cl.[7] .................................. H01J 3/14; H01J 5/16; H01J 40/14
[52] U.S. Cl. ........................................ 250/234; 235/467
[58] Field of Search .............................. 250/234; 235/467

[56] References Cited

U.S. PATENT DOCUMENTS 5,854,713  12/1998  Kuroda ...................................... 250/234

Primary Examiner—Harold I. Pitts
Attorney, Agent, or Firm—Winston Hsu

[57] ABSTRACT

The present invention relates to an optical scanning module used in an optical scanner for scanning a document. The optical scanning module comprises a housing with an opening installed on its top for receiving light transmitted from the document, an optical sensor installed inside the housing for converting the light transmitted from the document into corresponding image signals, a mirror set comprising a plurality of reflective mirrors installed inside the housing for passing the light transmitted from the document to the optical sensor, and a lens set installed between the optical sensor and the mirror set inside the housing for focusing the light transmitted from the document onto the optical sensor. The lens set and the optical sensor are movably installed inside the housing, or at least one reflective mirror of the mirror set is moveably installed inside the housing over which the length of an optical path from the document to the lens set can be adjusted by moving both the lens set and optical sensor or by moving the movable reflective mirror to calibrate the accumulated tolerance generated by various components of the scanning module.

4 Claims, 3 Drawing Sheets

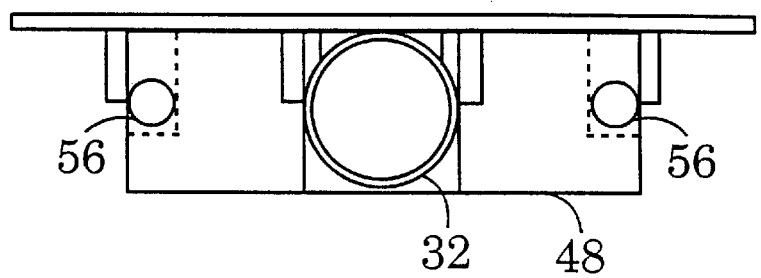
FIG. 7
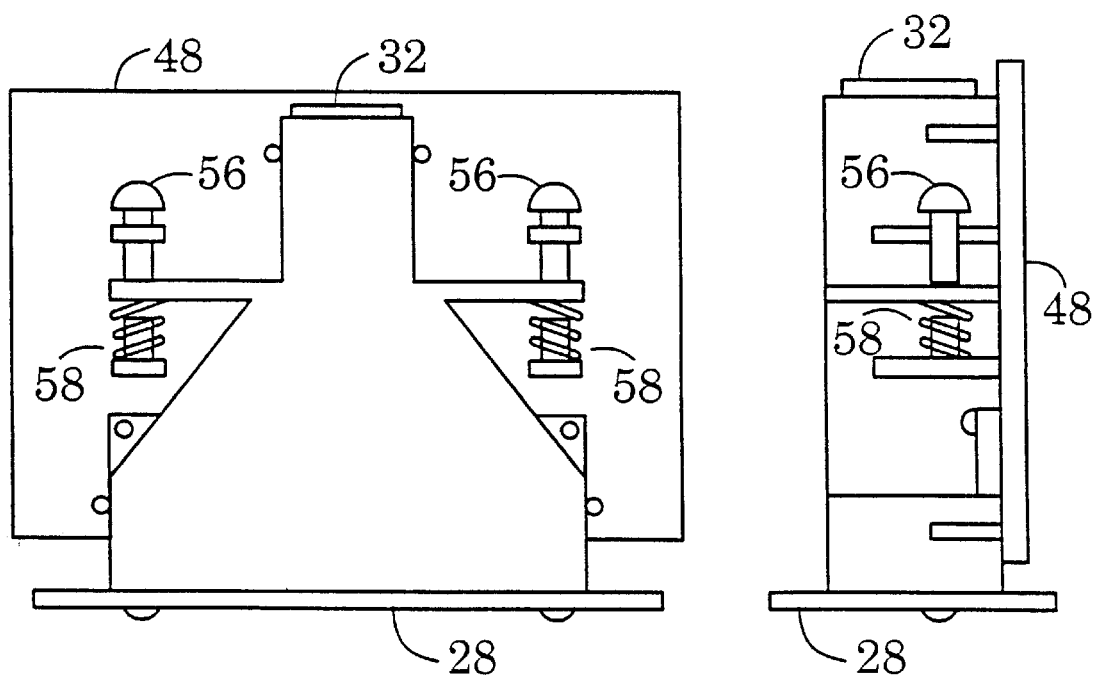
FIG. 8  FIG. 9

OPTICAL SCANNING MODULE WITH ADJUSTABLE OPTICAL PATH

BACKGROUND OF THE INVENTION

1. Field of the Invention

The invention relates to an optical scanning module of a scanner, and more particularly, to an optical scanning module with an adjustable optical path.

2. Description of the Prior Art

Flatbed scanners are widely used with computer systems for converting printed data into image signals. An optical scanning module is the most important component of the flatbed scanner. The scanning module commonly comprises a housing with an opening for receiving light transmitted from a document, an optical sensor installed inside the housing for converting the transmitted light into corresponding image signals, and a plurality of lenses for focusing the transmitted light onto the optical sensor.

The scanning module has a fixed resolution determined by the image amplification of the optical scanning module and the resolving power of the optical sensor. The image amplification of the scanning module is dependent on its lens, the object distance between the document and lens, and the image distance between the lens and optical sensor. If errors of the object and image distances are generated during the installation of the scanning module, the resolution of the scanning module will be affected.

As users demand improved image quality, achieving fewer amplification errors within the scanning module becomes an important issue. Most lenses and reflective mirrors of the scanning module have some production errors, and further positioning errors during installation of components often occur. These errors cause deterioration of the amplification of the scanning module. If error tolerance of lenses and mirrors is very strict, the yield of the scanning module will decrease and calibrations and production costs will increase.

SUMMARY OF THE INVENTION

It is therefore a primary objective of the present invention to provide an optical scanning module to solve the above mentioned problems.

In a preferred embodiment, the present invention provides an optical scanning module used in an optical scanner for scanning a document, the optical scanning module comprising:

a housing with an opening installed on its top for receiving light transmitted from the document;

an optical sensor installed inside the housing for converting the light transmitted from the document into corresponding image signals;

a mirror set comprising a plurality of reflective mirrors installed inside the housing for passing the light transmitted from the document to the optical sensor; and a lens set installed between the optical sensor and the mirror set inside the housing for focusing the light transmitted from the document onto the optical sensor;

wherein the lens set and the optical sensor are movably installed inside the housing, or at least one reflective mirror of the mirror set is moveably installed inside the housing over which the length of an optical path from the document to the lens set can be adjusted by moving both the lens set and optical sensor or by moving the movable reflective mirror to calibrate the accumulated tolerance generated by various components of the scanning module.

It is an advantage of the present invention that the lens set and the optical sensor are concurrently moveable so that the object distance can be changed, and the optical path error generated after installing all components can be calibrated without taking apart components of the scanning module.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 7 is a front view of the case shown in FIG. 6.

FIG. 8 is a top view of the case shown in FIG. 6.

FIG. 9 is a side view of the case shown in FIG. 6.

DETAILED DESCRIPTION OF THE PREFERRED EMBODIMENT

Figure 1:
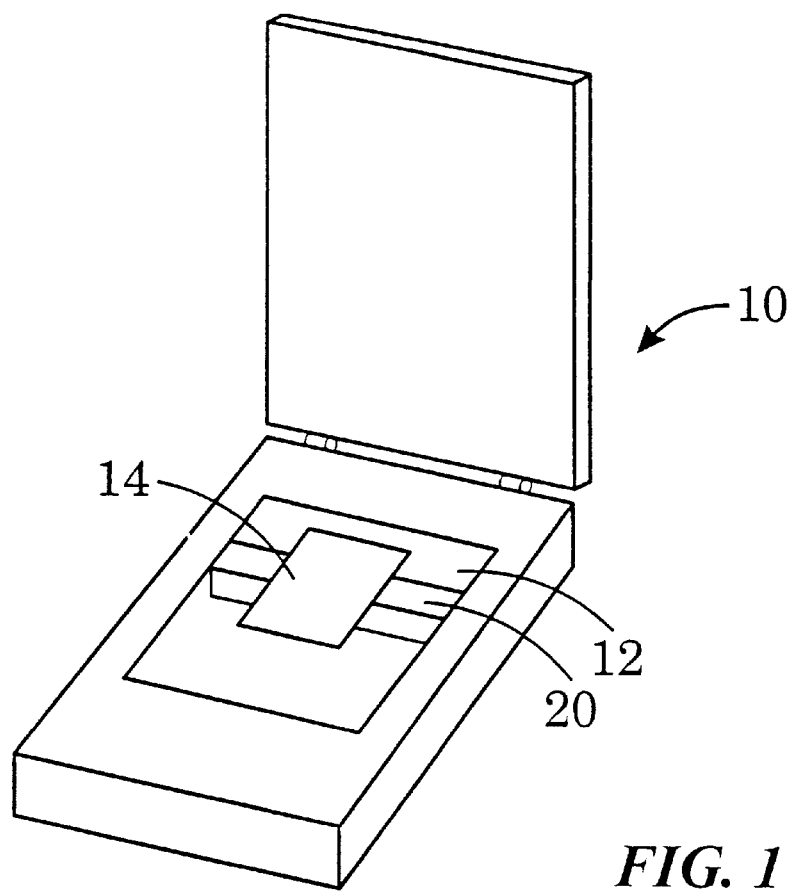
FIG. 1 is a perspective view of a scanner according to the present invention.

Please refer to FIG. 1. FIG. 1 is a perspective view of a scanner 10 according to the present invention. The scanner 10 comprises a transparent platform 12 for placing a document 14 to be scanned, and an optical scanning module 20 movably installed inside the scanner 10 for scanning the document 14.

Figure 2:
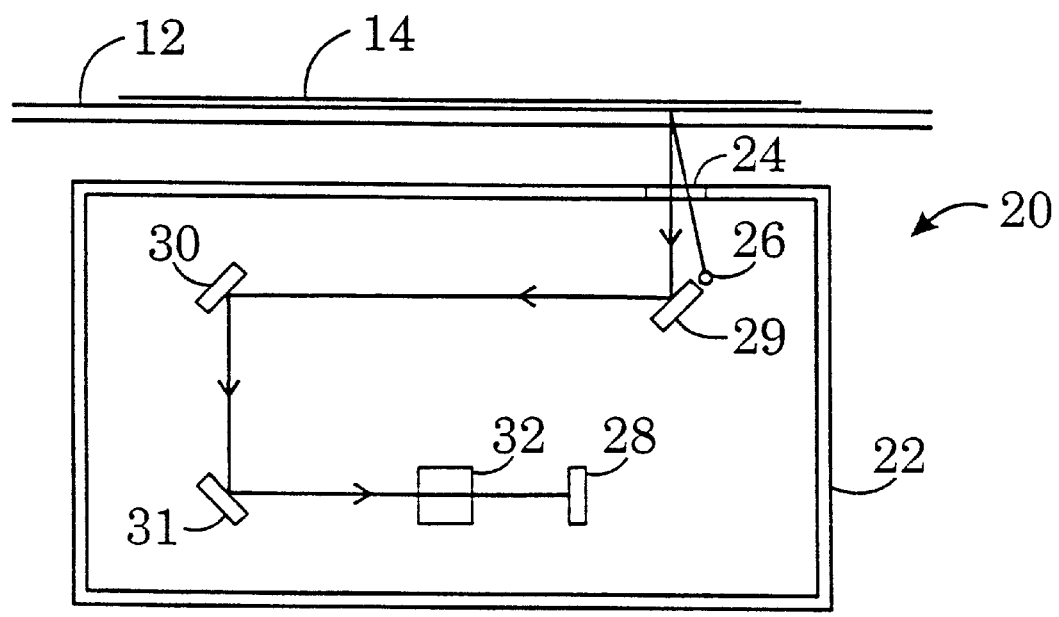
FIG. 2 is a perspective view of the optical scanning module of the scanner shown in FIG. 1.

Please refer to FIG. 2. FIG. 2 is a perspective view of the optical scanning module 20 of the scanner 10. The scanning module 20 comprises a housing 22 with an opening 24 installed on its top for receiving light transmitted from the document 14, a light source 26 installed inside the housing 22 for emitting light, an optical sensor 28, which is a charge coupled device, installed inside the housing 22 for converting the light transmitted from the document 14 into corresponding image signals, three reflective mirrors 29, 30, 31 for reflecting the light transmitted from the document 14 to the optical sensor 28, and a lens 32 installed between the reflective mirror 31 and the sensor 28 for focusing the light transmitted from the document 14 onto the sensor 28. When the scanner 10 scans the document 14, the light sequentially passes each reflective mirror 29, 30, 31 and the lens 32 before being focused onto the sensor 28 to be converted into corresponding image signals.

Figure 3:
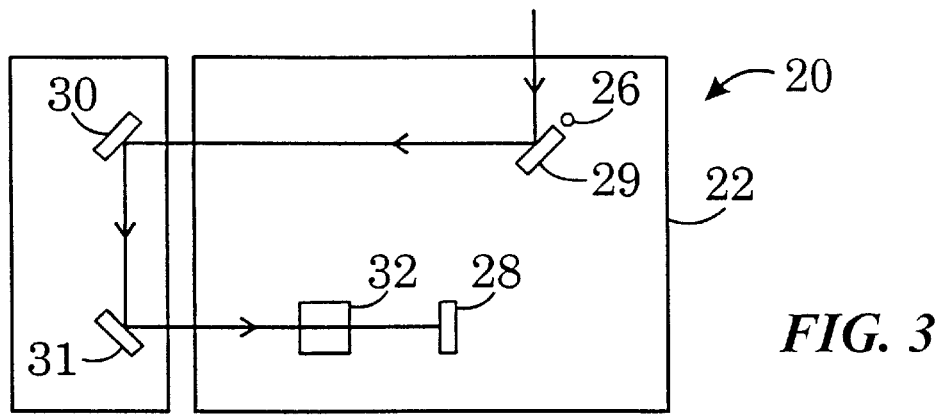
FIGS. 3, 4, 5 and 6 show four embodiments of the optical scanning module in FIG. 2 with an adjustable optical path.

Please refer to FIGS. 3 to 6. FIGS. 3 to 6 show four embodiments of the optical scanning module 20 with an adjustable optical path. As FIG. 3 shows, the reflective mirrors 30 and 31 of the scanning module 20 are horizontally movable in a left-right direction thereby increasing or decreasing the optical path. Movement of the reflective mirror 30 changes its incoming optical path from the reflective mirror 29, and movement of the reflective mirror 31 changes the outgoing optical path from the reflective mirror 31 to the optical sensor 28. Therefore, when calibrating a particular optical path tolerance, the reflective mirrors 30 and 31 need only be moved half of the calculated distance of the optical path error.

Figure 4:
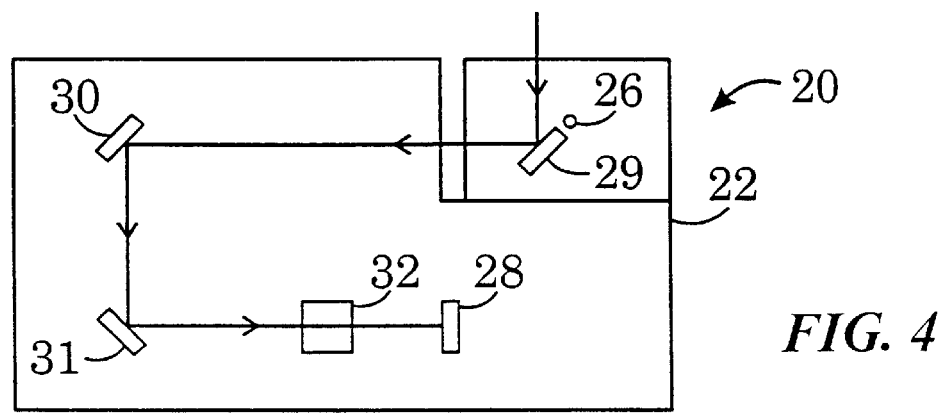

In FIG. 4, only the reflective mirror 29 of the scanning module 20 is moveable, thus the optical path error of the scanning module 20 is calibrated by making left-right horizontal movements of the reflective mirror 29. The main function of the reflective mirror 29 is to pass light from the document 14 to the reflective mirror 30 therefore as reflective mirror 29 moves, the scanning position on the transparent platform 12 of the scanner 10 makes corresponding movements.

Figure 5:
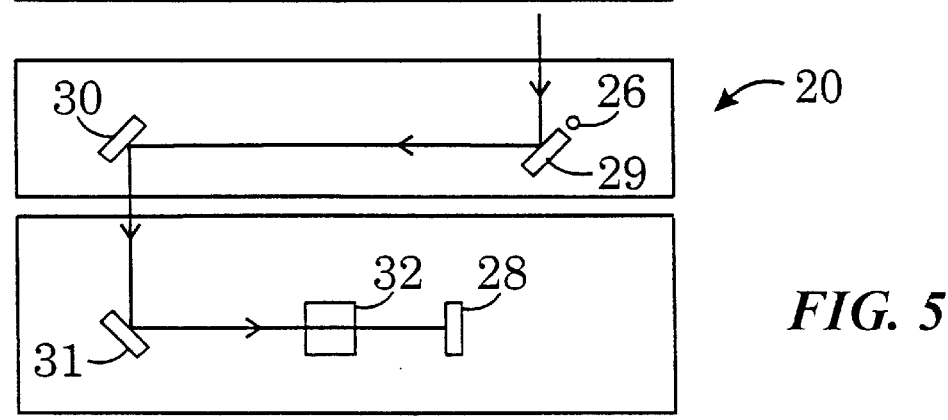
Figure 6:
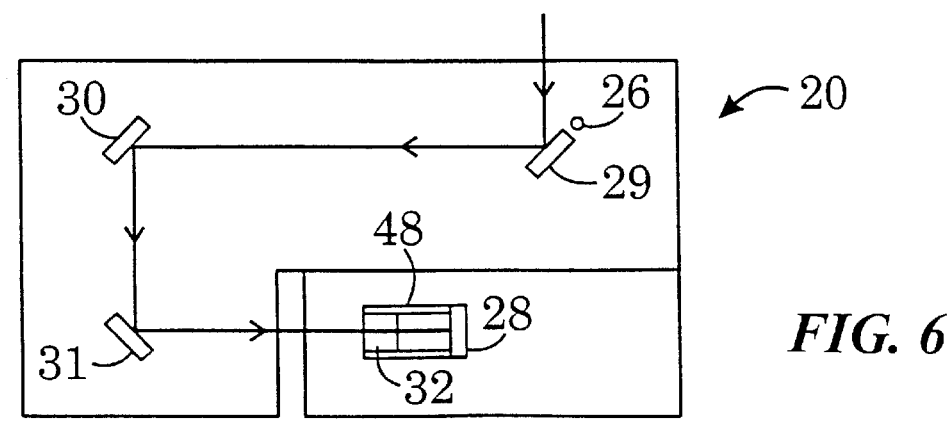

In FIG. 5, the optical path error of the scanning module 20 is calibrated by perpendicularly moving the reflective mirror 31, lens 32 and optical sensor 28 up-and-down concurrently. In FIG. 6, the optical path of the scanning module 20 is increased or decreased by horizontally moving the lens 32 and the optical sensor 28 left and right. The scanning module 20 further comprises a case 48 movably installed inside housing 22 of the scanning module 20 for mounting the lens 32 and the optical sensor 28.

Please refer to FIGS. 7 to 9. FIG. 7 is a front view of the case 48, FIG. 8 is a top view of the case 48, and FIG. 9 is a side view of the case 48. The case 48 comprises two adjustable screws 56 for adjusting two ends of the case 48 inside the housing 22, and two springs 58 separately installed between the two adjustable springs 56 and two ends of the case 48 for fixing the two ends of the case 48 so as to avoid vibrations of the case 48. Because the lens 32 is used for focusing the light transmitted from the document 14 onto the optical sensor 28, the distance between the lens 32 and the optical sensor 28 must be fixed. When using the moveable lens 32 to change the object distance, the optical sensor 28 must move correspondingly to maintain the same image distance. The installation of the case 48 in the scanning module 20 enables changing the object distance without changing the image distance.

The scanning module 20 of the present invention comprises an adjustable optical path. Moreover, the optical path error generated after installation of all components may be calibrated without taking apart each component of the scanning module 20. This reduces production cost of the scanning module 20 and greatly increases yield.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical scanning module used in an optical scanner for scanning a document, the optical scanning module comprising:

a housing with an opening installed on its top for receiving light transmitted from the document;

an optical sensor installed inside the housing for converting the light transmitted from the document into corresponding image signals;

a mirror set comprising a plurality of reflective mirrors installed inside the housing for passing the light transmitted from the document to the optical sensor; and a lens set installed between the optical sensor and the mirror set inside the housing for focusing the light transmitted from the document onto the optical sensor;

wherein the lens set and the optical sensor are movably installed inside the housing, or at least one reflective mirror of the mirror set is moveably installed inside the housing over which the length of an optical path from the document to the lens set can be adjusted by moving both the lens set and optical sensor or by moving the movable reflective mirror to calibrate the accumulated tolerance generated by various components of the scanning module.

2. The optical scanning module of claim 1 wherein the optical sensor is a charge coupled device for converting the light transmitted from the document into corresponding image signals.

3. The optical scanning module of claim 1 wherein the lens set and the optical sensor are installed inside a case, and the case is moveably installed within the housing.

4. The optical scanning module of claim 3 further comprising two adjustable screws for adjusting two ends of the case on the housing, and two springs separately installed between the two adjustable screws and the two ends of the case for fixing the two ends of the case to prevent the case from vibrations.

* * * * *